May 28, 1963 W. J. TANCIG 3,090,993
COMPARISON INSTRUMENT
Filed Aug. 26, 1959 3 Sheets-Sheet 3

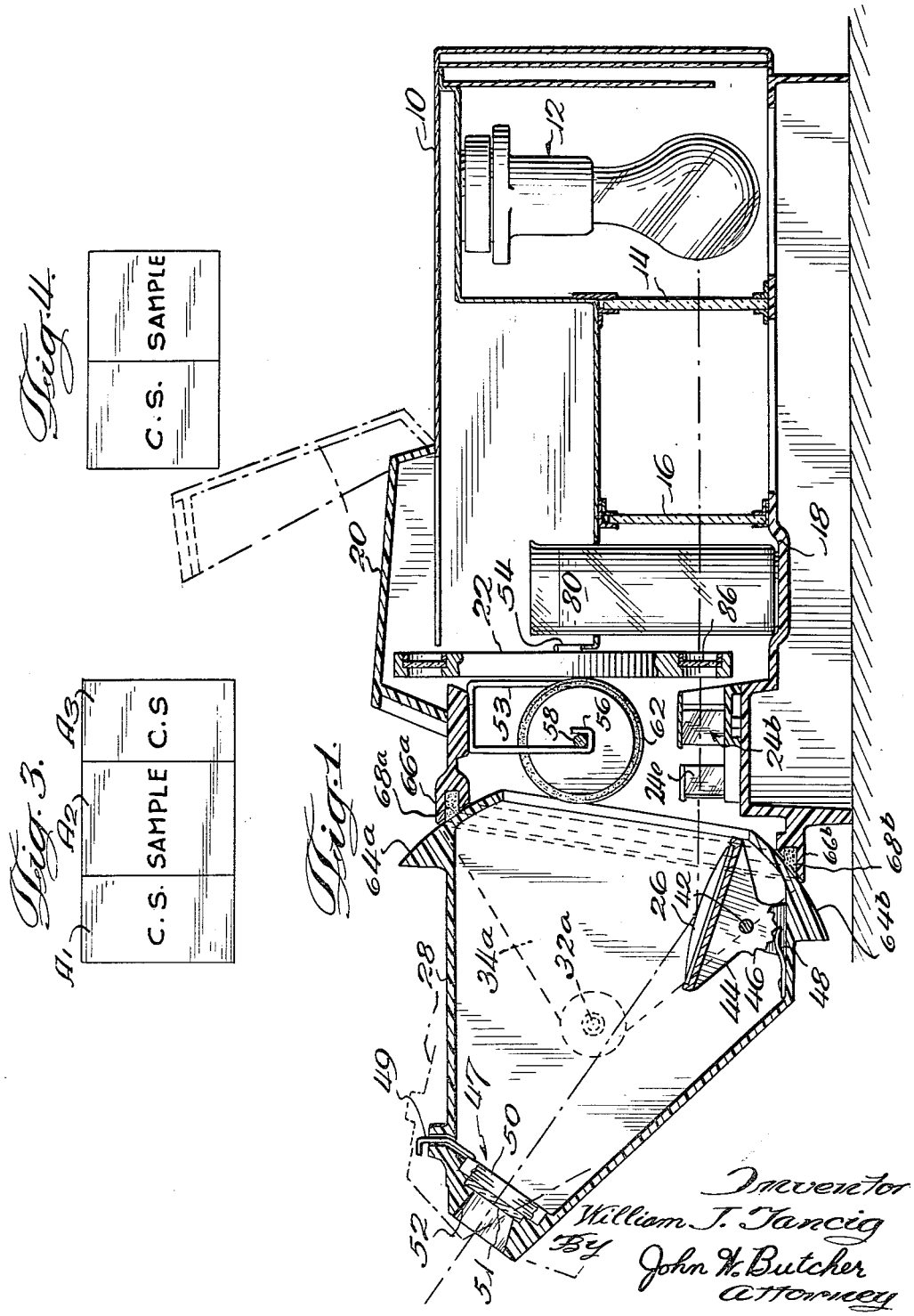

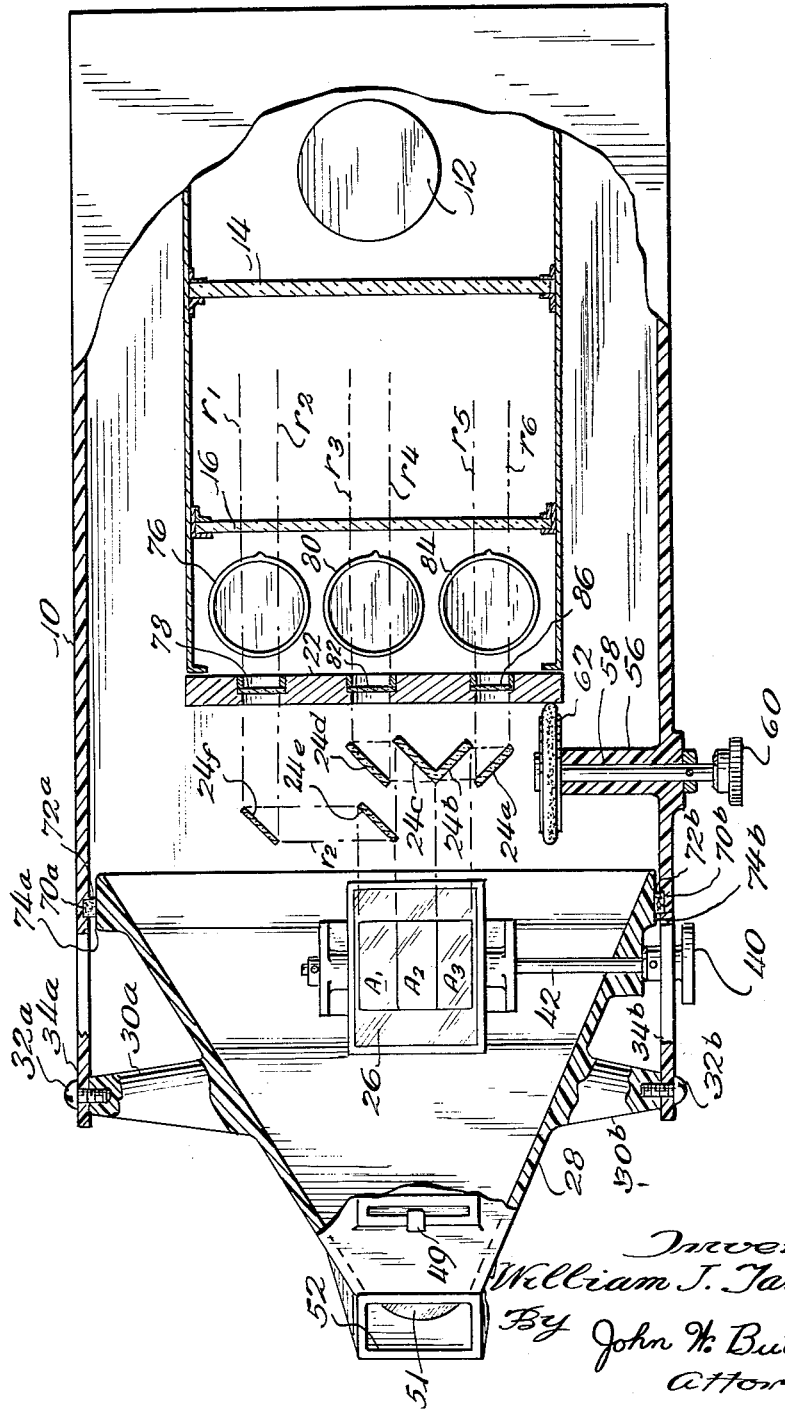

Inventor
William J. Tancig
By John W. Butcher
Attorney

United States Patent Office 3,090,993
Patented May 28, 1963

3,090,993
COMPARISON INSTRUMENT
William J. Tancig, Beecher, Ill., assignor to Standard Oil Company, Chicago, Ill., a corporation of Indiana
Filed Aug. 26, 1959, Ser. No. 836,175
2 Claims. (Cl. 88—14)

This invention relates to an apparatus for comparing a sample with a known quality standard, and more particularly, to an improved apparatus for presenting a visual image of the sample and a visual image of the standard as one image.

As a means of illustration and not by way of limitation, the invention will be described as an improved colorimeter for determining the color of a liquid sample by comparing the color of the sample with a color standard. It will be understood that the invention is capable of being used with other comparison instruments such as, for example, turbidity meters, nephelometers, and the like.

Petroleum products are often marketed using specified color standards as a product quality control. A determination of the product color is usually made under conditions which exclude the effect of room lighting conditions. Colorimeters for this type of service are designed such that the color standard, the illumination means, the sample, the image emanating from the sample, and the image emanating from the standard are within a light-tight enclosure. These colorimeters are insensitive to lighting conditions within a laboratory. Colorimeters, heretofore used, present the image in such a manner that the image must be viewed from a position in close proximity to the viewing aperture of the colorimeter. Thus, as the operator's field of view changes from the lighting condition within the room to the lighting condition within the colorimeter, a finite amount of time is required for the operator's eye to become accustomed to the lighting condition change.

It is desirable to provide a colorimeter wherein the analysis is presented in such a manner that it may be viewed from a normal sitting or from a normal standing position. It is also desirable to provide a colorimeter wherein the image is presented in such a manner that the image may be viewed under room lighting conditions without being influenced by the room lighting conditions.

Colorimeters heretofore used have been operated on a "trial and error" basis, i.e., a color standard somewhat lighter than the sample is first compared with the sample and a plurality of reference standards each of which are progressively darker are successively compared with the sample. Normally, this procedure requires the operator to progress through the lighter color standards until a color standard having a color darker than the sample is found. The operator must then compare the sample with the previous lighter color standard and then with the darker color standard to determine which of the two color standards is the best index of the sample color. Obviously, this procedure is very time consuming.

It is, therefore, an object of this invention to provide a comparison instrument which is insensitive to room lighting conditions. It is a further object of this invention to provide a comparison instrument that presents an image which can be viewed from within a few inches of the viewing aperture to within several feet of the viewing aperture. A still further object of this invention is to provide a comparison instrument in which three energy signals (one from the sample, one from a first reference standard and one from a second reference standard) are presented in a contiguous manner to form a unitary image. A further object of this invention is to provide a comparison instrument which can be read from a normal sitting or from a normal standing position. A further object of this invention is to provide a comparison instrument that presents an image within a light-tight enclosure which image is reflected through an adjustable aperture such that the image can be viewed externally of the light-tight enclosure. A still further object of this invention is to provide a comparison instrument that is readily adaptable for use by personnel not having any special technical skill.

Briefly described, the invention includes a housing having a sample container compartment therein. A light source is positioned within one end of the housing such that light passes through one or more filter elements into and through the sample and into and through the reference standards. Separate rays of light emanate from at least one reference standard and from the sample. This light strikes a reflector and passes as a split-image to an image surface. The split-image presentation is viewed through an adjustable aperture.

The invention will be more clearly understood from the following detailed description of a specific example thereto read in conjunction with the accompanying drawings which form a part of this specification and in which:

FIGURE 1 is a side elevational view, partially in cross section, of the preferred embodiment of the colorimeter;

FIGURE 2 is a top view, partially in cross section, of a preferred embodiment of the colorimeter;

FIGURE 3 is a schematic representation of the image from the sample and the images from a plurality of color standards as they appear on the image surface of the colorimeter;

FIGURE 4 is a schematic representation of the image from the sample and the image from a color standard as they appear on the image surface of previously known colorimeters;

Figure 5:
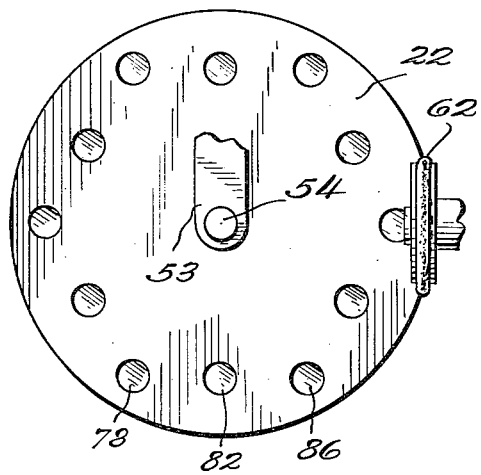
FIGURE 5 is a view of the color standards as they are arranged within the color standards magazine.

In reference to the drawing, and more particularly, FIGURES 1 and 2, a light-tight enclosure 10 includes a light source 12, a daylight filter 14, a flashed opal filter 16, a sample container compartment 18, a sample container compartment cover 20, a revolving color standards magazine 22, mirrors 24a, 24b, 24c, 24d, 24e, and 24f, an image mirror 26, and a viewer 28.

The viewer 28 is pivotally mounted to the light-tight enclosure 10, by means of arms 30a and 30b, pivot screws 32a and 32b, and container arms 34a and 34b. The viewer 28 fits within light-tight enclosure 10 such that the viewer 28 may be pivoted with respect to the light-tight enclosure 10. An adjustable image mirror 26 is pivotally mounted within the viewer 28. The image mirror 26 may be rotated with respect to the viewer 28 by means of an image knob 40 which is attached by way of a rod 42 to the base section 44 of the image mirror 26. The base section 44 includes a serrated part 46 which engages a resilient member 48.

The viewer 28 contains an adjustable aperture 47. An adjustable aperture, as used herein, means any passageway through the viewer 28 wherein the effective diameter of the aperture may be changed. The illustrated adjustable aperture is constructed similar to a camera f-stop iris diaphragm. The handle 49, is moved to contract or to enlarge the diameter of the iris 50. The iris 50 and glass cover 51 are shielded from direct light by the hood 52. Obviously the adjustable aperture may be integral with or separable from the viewer 28.

The revolving color standards magazine 22 is rotatably mounted to a framework 53 within the light-tight compartment 10 by a pin 54. The framework 53 includes a support 56 for a color standards axle 58 and the color standards knob 60. A friction wheel 62 is connected to the color standards axle 58 and engages the color standards magazine 22. Thus, the revolving color standards magazine 22 may be rotated by turning color standards knob 60 which is attached to color standards axle 58 which in turn is attached to friction wheel 62.

A light-tight seal is provided between the viewer 28 and the light-tight enclosure 10. A vertical cross section, as shown in FIGURE 1, illustrates the provision for maintaining a light-tight seal on the top and the bottom sides of the light-tight enclosure 10. A top arcuated end 64a fits adjacent a top edge 66a. A bottom arcuated end 64b fits adjacent a bottom edge 66b. Packing material 68a provides a light-tight seal between the top arcuated end portion 64a and the top edge 66a. Packing material 68b also provides a light-tight seal between the bottom arcuated end portion 64b and the bottom edge 66b. A horizontal cross section, as shown in FIGURE 2, illustrates the provision for maintaining a light-tight seal between the sides of the light-tight enclosure 10 and the sides of the viewer 28. Channels 70a and 70b within the sides of the light-tight enclosure 10 are adapted to receive the side packing material 72a and 72b. The side packing material 72a and 72b engages the side faces 74a and 74b of the viewer 28.

A triple image view is presented on the image mirror 26 by an arrangement as illustrated in FIGURE 2. Parallel light rays defined by lines $r_1$ and $r_2$ pass through a first colorless standard fluid container 76, pass through a first color standard 78, strike mirror 24f and 24e and reflect on a first area $A_1$ of the image mirror 26. Parallel light rays defined by lines $r_3$ and $r_4$ pass through a sample container 80, pass through a clear glass 82, strike mirrors 24d and 24c and reflect on a second area $A_2$ of the image mirror 26. Parallel light rays defined by lines $r_5$ and $r_6$ pass through a second colorless standard fluid container 84, pass through a second color standard 86, strike mirrors 24a and 24b and reflect on a third area $A_3$ of the image mirror 26.

FIGURE 5 illustrates the arrangement of the color standards within the color standards magazine. The color standards are arranged in a hexagonal pattern on the circular color standards magazine with the color standards positioned at the intersection of each side of the hexagon. A clear glass is placed midway between each color standard.

Figure 6:
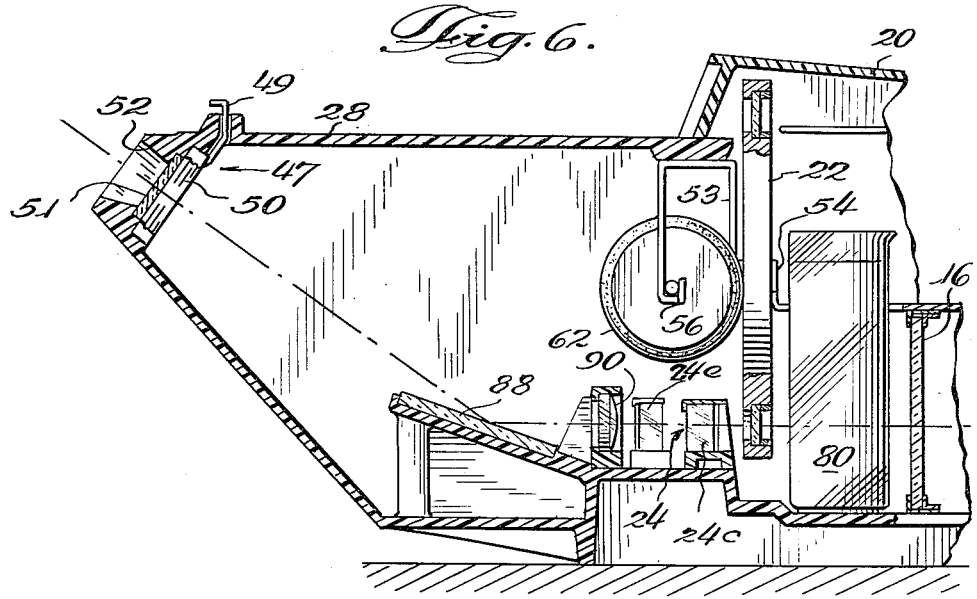
FIGURE 6 is a view, partially in cross section, of an alternate embodiment of the present inventin.

FIGURE 6 illustrates an alternate arrangement of the image mirror. A flat image mirror 88 is attached to the viewer 28. Light rays pass through a lens 90 prior to striking the flat image mirror 88. The lens 90 magnifies the image. This embodiment resembles the preferred embodiment in that it presents a triple image which is viewed through an adjustable aperture. It differs from the preferred embodiment in that the viewer 28 is fixed with respect to the light-tight compartment.

In operation, the sample container compartment cover 20 is raised to a position as indicated by the dotted lines in FIGURE 1. A sample container 80 is inserted into the sample container compartment 18. A first colorless standard fluid container 76 (containing a colorless fluid similar to the sample fluid) is placed within the sample container compartment 18. A second colorless standard fluid container 84 (containing a colorless fluid similar to the sample fluid) is placed within the sample container compartment 18. The sample container compartment cover 20 is then lowered to the position as shown by the solid lines of FIGURE 1. The light source 12 is energized. The viewer 28 is adjusted by first loosening pivot screws 32a and 32b, rotating the viewer 28 with respect to the light-tight enclosure 10 until the adjustable aperture means 47 is aligned with the image mirror 26. The pivot screws 32a and 32b are tightened to anchor the viewer 28 with respect to the light-tight enclosure 10. The iris means 50 is adjusted to suit the operator by moving the adjustment handle 49. The color standards knob 58 is rotated until an image from the first color standard (lighter than the image from the sample) appears on the first side of the image from the sample and a second image (darker than the image from the sample) appears on a second side of the image from the sample. These two color standards are used to determine the color of the sample.

Although my invention has been described in terms of its use as a liquid sample color control instrument, the invention is not limited to this particular use. Other translucent materials, for example, solids, semi-solids, and gases can be analyzed with the comparison instrument. The solid and semi-solid samples may be placed in slides in lieu of the glass sample tube. The gas samples may be placed in a sealed tube. Translucent goods, such as fabrics, may be compared with on opaque standards within the disclosed instrument.

From the above, it will be apparent that I have attained the objects of my invention and have described an apparatus broadly and specifically which has features that gives it considerable utility in many applications. The simplicity and rapidity of operation makes it particularly useful for production control operations. The disclosed comparison instrument is readily adaptable for use by factory personnel not having any special technical skill.

Although I have described my invention by reference to specific embodiments, it is to be understood that this is by way of illustration only and that my invention is not limited thereto. Accordingly, it is contemplated that other apparatus can be devised employing the basic features of my invention without departing from the spirit thereof as described herein or as defined by the appended claims.

I claim:

1. A colorimeter comprising an elongated light-tight enclosure having a first end and a second end, a light source mounted within said enclosure at said first end, a light image means pivotally mounted within said enclosure at said second end, a first light reflector mounted within said enclosure between said light image means and said light source adapted to reflect light emanating from said light source toward a first area on said image means, a second light reflector mounted within said enclosure between said light image means and said light source adapted to reflect light emanating from said light source toward a second area on said image means, a third light reflector mounted within said enclosure between said light image means and said light source adapted to reflect light emanating from said light source toward a third area on said image means, a color standards magazine having a first side and a second side, said color standards magazine rotatably mounted within said enclosure such that said first reflector and said second reflector are on a first side of said color standards magazine and said light source is on said second side thereof, a plurality of color standards mounted within said color standards magazine such that as said color standards magazine is rotated, one of said color standards is positioned between said first reflector and said light source while another of said color standards is positioned between said second reflector and said light source, and a sample container compartment arranged to receive a sample and position said sample between said third reflector and said light source.

2. A colorimeter comprising an elongated light-tight enclosure having a first end and a second end, a light source mounted within said enclosure at said first end, a light image means pivotally mounted within said enclosure at said second end, a first light reflector mounted within said enclosure between said light image means and said light source adapted to reflect light emanating from said light source toward a first area on said image means, a second light reflector mounted within said enclosure between said light image means and said light source adapted to reflect light emanating from said light source toward a second area on said image means, a third light reflector mounted within said enclosure between said light image means and said light source adapted to reflect light emanating from said light source toward a third area on said image means, a color standards magazine having a first side and a second side rotatably mounted within said enclosure such that said first reflector and said second reflector are on a first side of said color standards magazine and said light source is on said second side, a plurality of color standards mounted within said color standards magazine such that as said color standards magazine is rotated, one of said color standards is positioned between said first reflector and said light source while another said color standards is positioned between said second reflector and said light source, a sample container compartment within said light-tight enclosure located between said third light reflector and said light source, a viewer pivotally mounted at said second end forming a light-tight fit with said second end, and an adjustable aperture means located within said viewer.

References Cited in the file of this patent

UNITED STATES PATENTS

| | | |
|---|---|---|
| 696,371 | Graae | Mar. 25, 1902 |
| 1,675,967 | Zitkowski | July 3, 1928 |
| 2,030,329 | Simons | Feb. 11, 1936 |
| 2,063,222 | Beau | Dec. 8, 1936 |
| 2,090,041 | Gross | Aug. 17, 1937 |
| 2,422,498 | Perlman | June 17, 1947 |
| 2,489,723 | Resnick | Nov. 29, 1949 |
| 2,502,014 | Loggie | Mar. 28, 1950 |
| 2,566,079 | Bruning | Aug. 28, 1951 |
| 2,802,391 | Maier | Aug. 13, 1957 |

FOREIGN PATENTS

| | | |
|---|---|---|
| 15,475 | Great Britain | 1913 |
| 325,112 | Great Britain | Feb. 13, 1930 |